United States Patent [19]
Saitoh et al.

[11] Patent Number: 5,601,736
[45] Date of Patent: Feb. 11, 1997

[54] BUTT WELDING PROCESS USING HIGH DENSITY ENERGY BEAM

[75] Inventors: Yuji Saitoh; Minoru Mohko; Masakazu Sato, all of Saitama, Japan

[73] Assignee: Honda Giken Kogyo Kabushiki Kaisha, Tokyo, Japan

[21] Appl. No.: 517,274

[22] Filed: Aug. 21, 1995

[30] Foreign Application Priority Data

Aug. 22, 1994 [JP] Japan .................................. 6-197046

[51] Int. Cl.$^6$ .................................................. B23K 26/00
[52] U.S. Cl. .................................... 219/121.64; 219/105
[58] Field of Search ........................ 219/121.13, 121.14, 219/121.63, 121.64, 121.45, 121.46, 101, 102, 104, 105; 228/137, 151, 173.2, 173.3, 173.6; 72/253.1, 257

[56] References Cited

U.S. PATENT DOCUMENTS

| | | | |
|---|---|---|---|
| 2,619,574 | 11/1952 | Lambert | 219/105 |
| 3,168,777 | 2/1965 | DeRidder et al. | |
| 3,301,992 | 1/1967 | Seeloff | 219/105 |
| 3,436,515 | 4/1969 | Sayer et al. | 219/121.14 |
| 3,656,514 | 4/1972 | Kafka | 228/137 |
| 3,679,862 | 7/1972 | Stoll et al. | 219/121.64 |
| 3,748,432 | 7/1973 | Bosworth et al. | 219/121.13 |
| 3,814,479 | 6/1974 | Vornberger | 298/23 M |
| 4,063,062 | 12/1977 | Kuhnen | 219/121.14 |
| 4,266,381 | 5/1981 | Deller | 72/256 |
| 5,185,908 | 2/1993 | Oetiker | 24/20 R |

FOREIGN PATENT DOCUMENTS

| | | |
|---|---|---|
| 95113193 | 2/1966 | European Pat. Off. . |
| 0288884 | 4/1988 | European Pat. Off. . |
| 0288884A1 | 4/1988 | European Pat. Off. . |
| 57-115985 | 7/1982 | Japan .................. 219/121.14 |
| 3-133584 | 6/1991 | Japan .................. 219/121.14 |
| 3-275293 | 12/1991 | Japan .................. 219/121.63 |
| 4238669 | 8/1992 | Japan . |
| 5-161989 | 6/1993 | Japan .................. 219/121.63 |
| 447418 | 11/1967 | Switzerland . |
| 563833 | 5/1975 | Switzerland . |

Primary Examiner—Geoffrey S. Evans
Assistant Examiner—Gregory L. Mills
Attorney, Agent, or Firm—Lyon & Lyon

[57] ABSTRACT

First, welding protrusions of two aluminum alloy plates are butted against each other, and an engagement projection of one of the aluminum alloy plates is brought into engagement with an engagement recess of the other aluminum alloy plate, thereby maintaining the butted state and defining voids in back of butt regions of the welding protrusions in a direction of irradiation of a laser beam. Then, the laser beam is irradiated to the butt regions to bond the welding protrusions to each other. The $Al_2O_3$ films located on the surfaces of the welding protrusions on a back side in a direction of irradiation of the laser beam are pushed into the voids by a molten pool and hence, they cannot intrude into a weld zone to form a notch. By employing this arrangement in the butt welding using the laser beam, the need for a jig for maintaining the butted state of the aluminum alloy plates is eliminated and a butt joint having a high strength can be obtained.

10 Claims, 10 Drawing Sheets

5,601,736

BUTT WELDING PROCESS USING HIGH DENSITY ENERGY BEAM

BACKGROUND OF THE INVENTION

1. Field of the Invention

The present invention relates to a butt welding process using a high-density energy beam such as a laser beam, an electron beam or the like.

2. Description of the Prior Art

In the prior art butt welding process, a preselected jig is employed in order to maintain the butted state of two metal members (see Japanese Patent Application Laid-open No. 238669/92).

However, the prior art process has a problem that the welding operation is complicated, because the operation of the jig is essential.

SUMMARY OF THE INVENTION

It is an object of the present invention to provide a butt welding process of the above-described type, wherein the above problem can be overcome by previously providing a means for maintaining the butted state on two metal members themselves whereby a butt joint having a high bonding strength can be obtained.

To achieve the above object, according to the present invention, there is provided a butt welding process using a high density energy beam, comprising the steps of butting welding protrusions of two metal members against each other, bringing an engagement projection of one of the metal members into engagement with an engagement recess of the other metal member, thereby maintaining the butted state and defining voids in front of butt regions of the welding protrusions in a direction of irradiation of the high density energy beam, and then irradiating the high density energy beam to the butt regions to bond the welding protrusions to each other.

If the butted state of the welding protrusions is maintained by the engagement of the engagement projection of the one metal member with the engagement recess of the other metal member, a jig for maintaining the butted state is not required and hence, the welding operation is simplified.

With a metal member having a high-melting-temperature oxide film on its surface, when a molten pool is formed in the butt region, the high-melting-temperature oxide films located on the surfaces of the two welding protrusions on a front side in the direction of irradiation of the high density energy beam are pushed into the voids by the molten pool. Thus, a portion of each of the high-melting-temperature oxide films located on such surfaces cannot intrude into a fusion weld produced by the solidification of the molten pool to form a notch and therefore, a butt joint having a high strength is provided. In this case, the high-melting-temperature oxide film located on a rear side of the welding protrusions and the high-melting-temperature oxide film located on an end face of the welding protrusions are fractured and dispersed by an active agitating action of the molten pool and therefore the strength of the fusion weld is not adversely affected.

The above and other objects, features and advantages of the invention will become apparent from the following description of preferred embodiments taken in conjunction with the accompanying drawings.

DESCRIPTION OF THE PREFERRED EMBODIMENTS

FIGS. 1 to 7 illustrate a first embodiment of the present invention, and FIGS. 8 to 13 illustrate a second embodiment of the present invention. In these embodiments, a laser beam is described as being used as a high-density energy beam but other sources may be used.

First Embodiment

Figure 1:
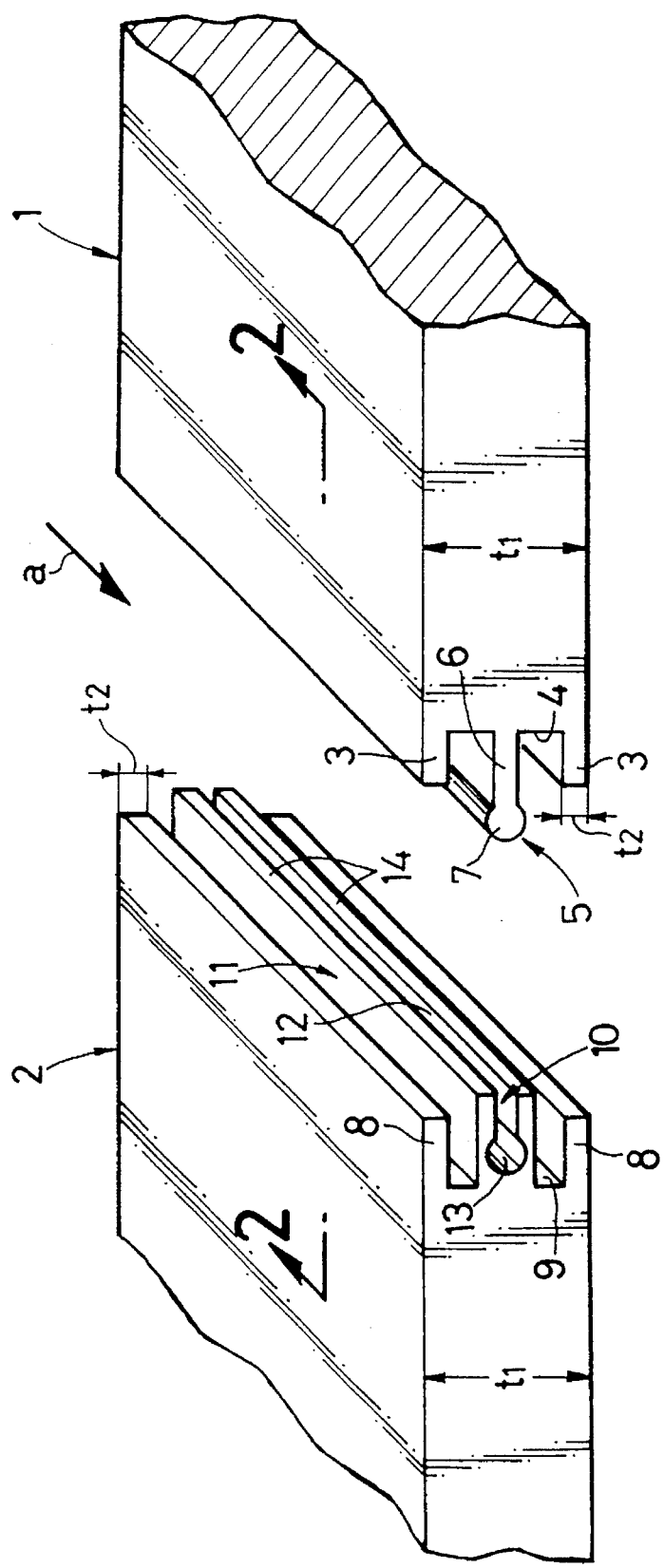
FIG. 1 is a perspective view of the essential portions of the zones to be butt welded of two aluminum alloy plates.
Figure 2:
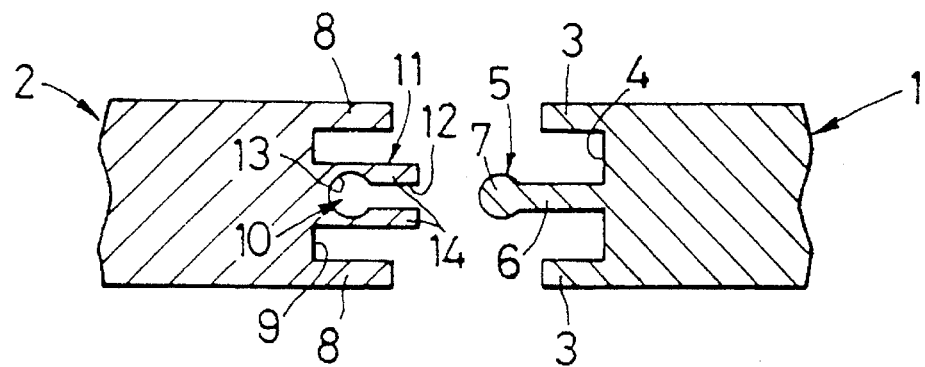
FIG. 2 is a sectional view taken along a line 2—2 in FIG. 1.
Figure 3:
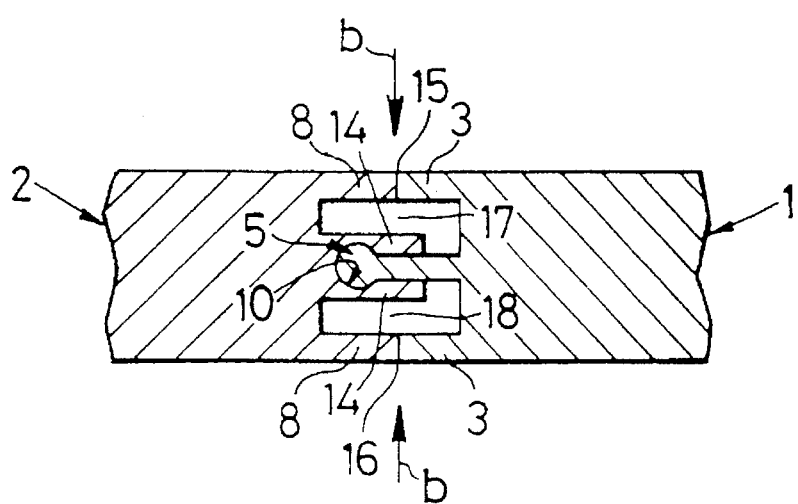
FIG. 3 is a sectional view of the two aluminum alloy plates in the butted state.

Referring to FIGS. 1 and 2, the two metal members to be butt welded are aluminum alloy plates 1 and 2 which are formed by extruding aluminum to the desired shape of an extrusion.

One of the aluminum alloy plates 1 has, on one end extending in the extruding direction "a", a pair of welding plate-like protrusions 3 extending parallel to each other from two planes, and an engagement projection 5 protruding from an end face 4 between both the protrusions 3. The engagement projection 5 is comprised of a plate-like portion 6 connected to the end face 4, and a bead-like portion 7 connected to a tip end edge of the plate-like portion 6.

The other aluminum alloy plate 2 has, on one end extending in the extruding direction "a", a pair of welding plate-like protrusions 8 extending parallel to each other from two planes, and a plate-like member 11 extending from an end face 9 between both the protrusions 8 and having an engagement recess 10. The engagement recess 10 is comprised of a guide groove 12 opening into a tip end face of the plate-like member 11, and a locking groove 13 connected to an innermost end of the guide groove 12 and having a major arc-shaped inner surface.

In butt-welding the aluminum alloy plates 1 and 2 by a laser beam, the following steps are conducted sequentially.

(a) As shown in FIG. B, the welding protrusions 3 of the one aluminum alloy plate 1 and the welding protrusions 8 of the other aluminum alloy plate 2 are butted against each other, and the bead-like portion 7 of the engagement projection 5 is passed through the guide groove 12 of the engagement recess 10 to engage the locking groove 13. The passing of the bead-like portion 7 through the guide groove 12 is permitted by the resilient expansion of a guide groove forming portion 14 of the plate-like member 11.

The engagement of the engagement projection 5 with the engagement recess 10 maintains the butted state and defines voids 17 and 18 forwardly in a direction "b" of irradiation of the laser beam in two butt regions 15 and 16 of the welding protrusions 3 and 8.

If the butted state of the welding butted portions B and 8 is maintained by the engagement of the engagement projection 5 of the one aluminum alloy plate 1 with the engagement recess 10 of the other aluminum alloy plate 2 in this manner, a jig for maintaining the butted state is not required, leading to a simplified welding operation.

Figure 4:
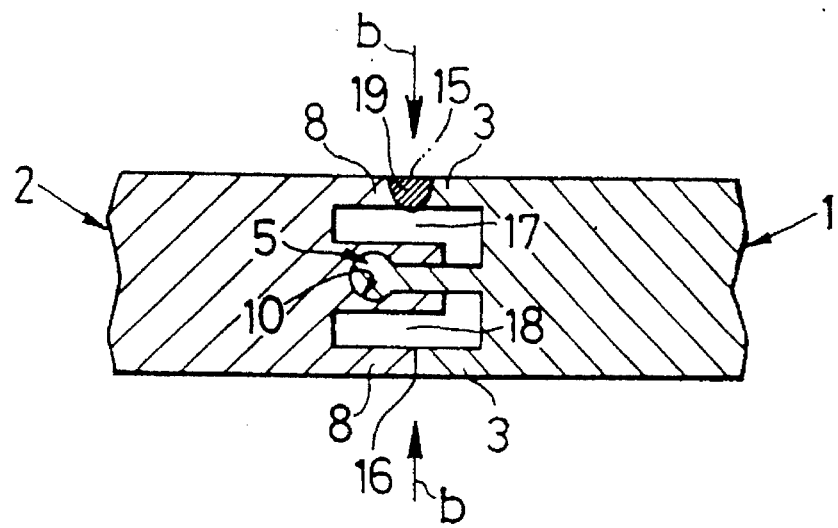
FIG. 4 is a sectional view of the two aluminum alloy plates welded in one of the butted regions by a laser.

(b) As shown in FIG. 4, the laser beam is irradiated to one butt region 15 to bond the welding protrusions 3 and 8 to each other through a fusion weld 19 without melting of the engagement recess and projection 5 and 10.

Figure 5:
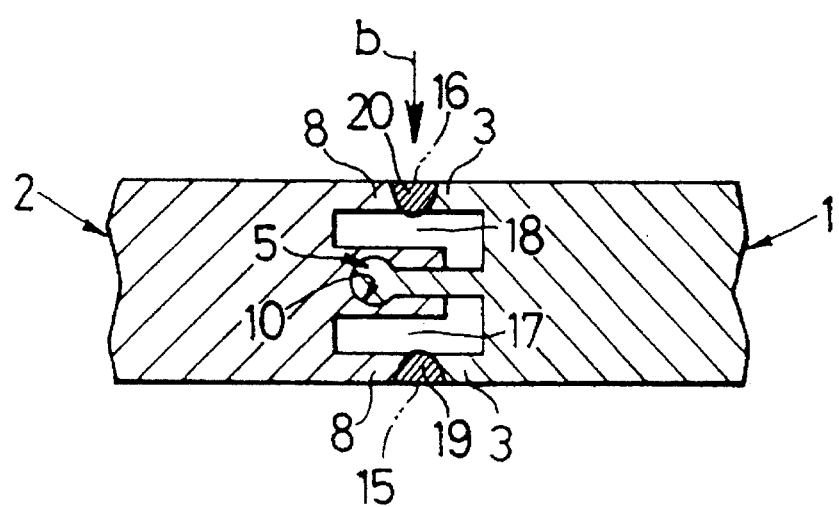
FIG. 5 is a sectional view of the two aluminum alloy plates welded in the other butt region by a laser.

(c) As shown in FIG. 5, the aluminum alloy plates 1 and 2 are turned from top to bottom and then the laser is irradiated to the other butt region 16 to bond the welding protrusions 3 and 8 through a fusion weld 20 without melting of the engagement recess and projection 5 and 10.

In this case, the engagement recess and projection 5 and 10 are located inside of a pair of butt joints, leading to a good exterior appearance.

Figure 6:
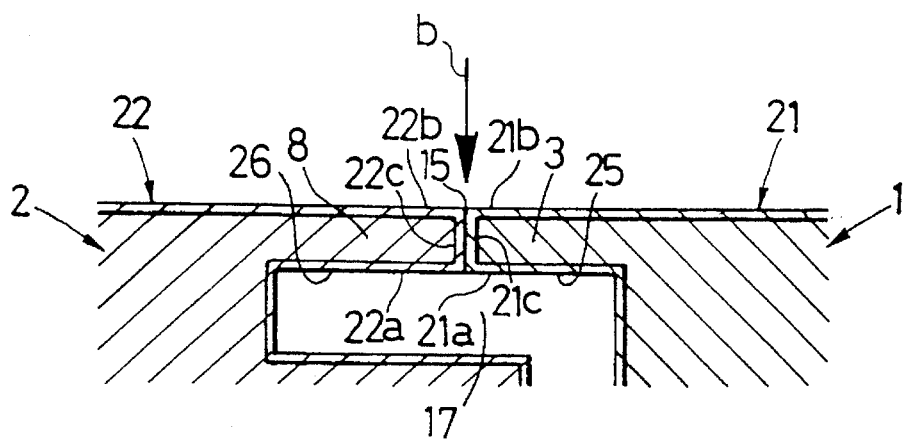
FIG. 6 is an enlarged sectional view of the essential portions, similar to FIG. 3.
Figure 7:
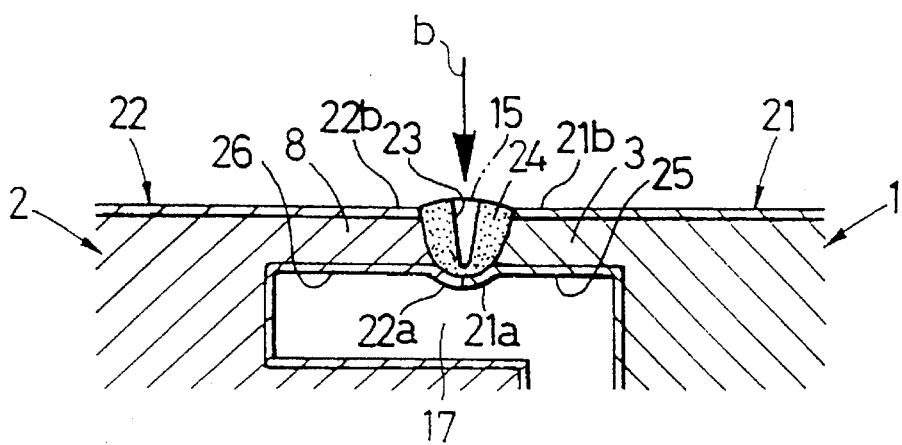
FIG. 7 is an enlarged sectional view of the essential portions, similar to FIG. 4.

As shown in FIG. 6, each of the aluminum alloy plates 1 and 2 has an $Al_2O_3$ film 21, 22 which is a high-melting-temperature oxide film. In such a case, if a molten pool 24 is formed around a key hole 23 in the one butt region 15, as shown in FIG. 7, the $Al_2O_3$ films 21a and 22a located on inner surfaces 25 and 26 of the butt portions of welding protrusions 3 and 8 on a front side as viewed in the direction "b" of irradiation of the laser beam are pushed into the void 17 by the molten pool 24. Thus, a portion of each of the $Al_2O_3$ films 21a and 22a located on the inner surfaces 25 and 26 cannot intrude into the fusion weld 19 produced by solidification of the molten pool 24 to form a notch and therefore, a butt joint having a high strength is obtained. In this case, $Al_2O_3$ films 21b and 22b located on a rear side as viewed in the direction b of irradiation of the laser beam and $Al_2O_3$ films 21c and 22c located on the end faces of the butt portions 3 and 8 are fractured and dispersed by an active agitating action of the molten pool 24 and hence the strength of the fusion weld 19 is not adversely affected.

Such a phenomenon is also generated in the other butt region 16.

In the above-described butt welding, if an inert gas such as helium, argon, nitrogen gas or a mixture thereof is passed through the voids 17 and 18 to maintain the insides of the voids 17 and 18 in an inert atmosphere, oxidation within the voids 17 and 18 can be prevented to avoid the inclusion of the oxides into the fusion welds 19 and 20, thereby avoiding a reduction in strength of the fusion welds 19 and 20.

An example of the specifications and conditions for the butt welding of this embodiment of the invention are as follows: when the material for the aluminum alloy plates 1 and 2 is 6063 aluminum alloy; the thickness $t_1$ of the aluminum alloy plates 1 and 2 is equal to 10 mm; and the thickness of the welding protrusions 3 and 8 is equal to 1.5 mm, the type of laser is a carbon dioxide gas laser; the laser output is of 3 kW; the welding speed is 4 m/min; the type of a filler wire is A5356-WY; the diameter of the filler wire is of 1.2 mm; and the supply rate of the filler wire is of 4 m/min.

Second Embodiment

Figure 8:
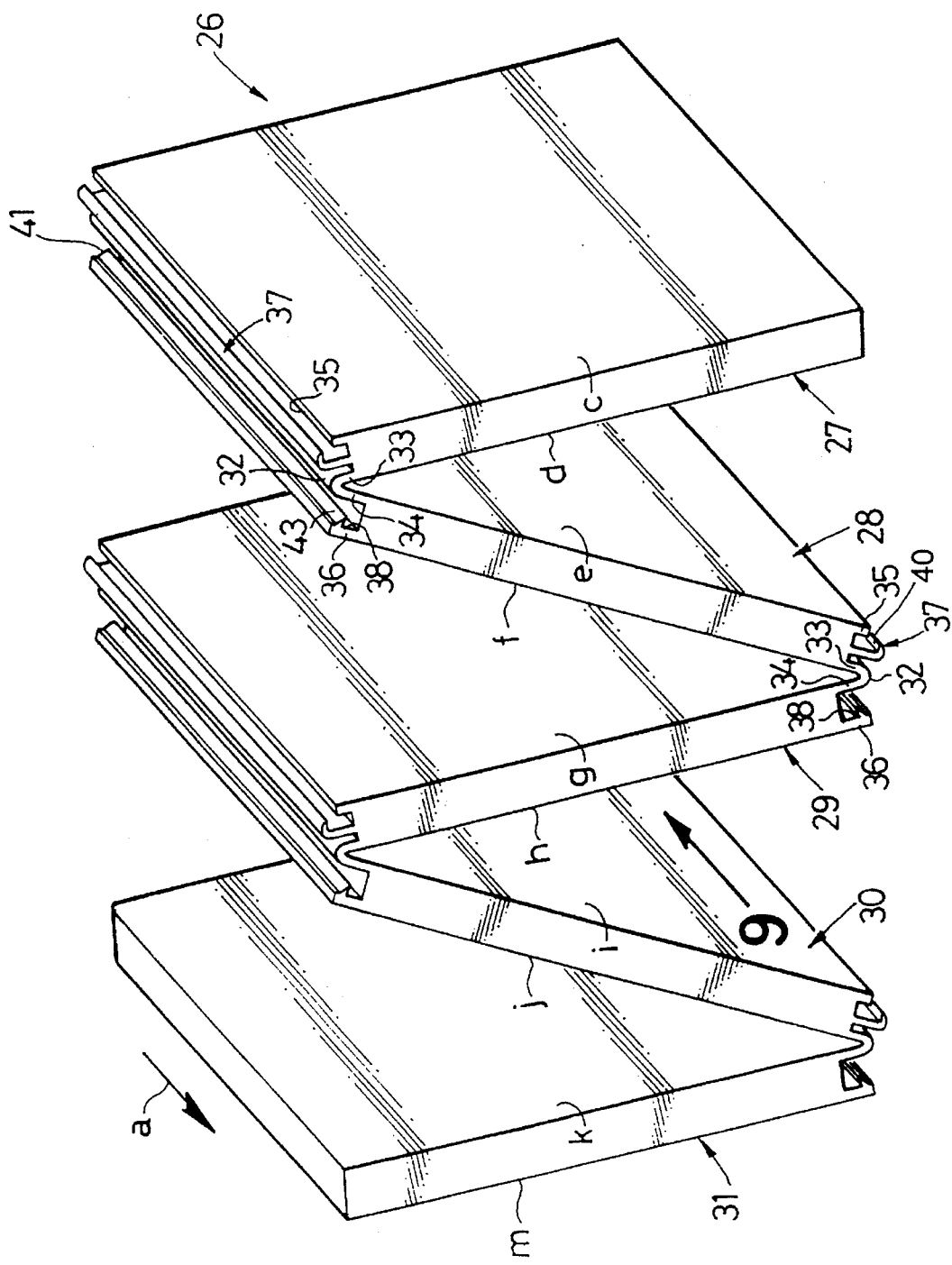
FIG. 8 is a perspective view of one example of an extrusion.
Figure 9:
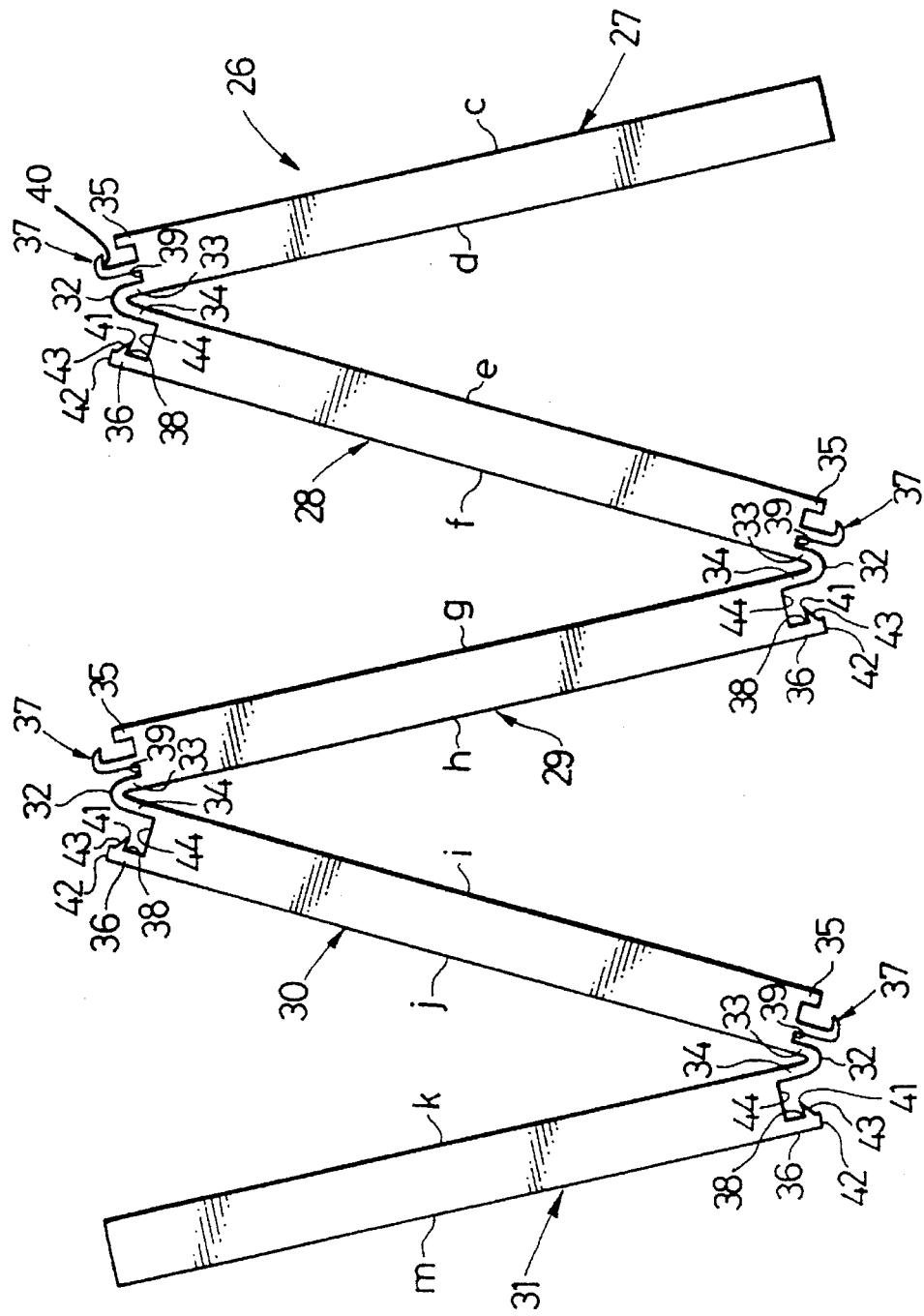
FIG. 9 is a view taken along an arrow 9 in FIG. 8.

In this embodiment shown in FIGS. 8 to 13, an extrusion 26 includes a plurality of plate-like metal members connected together and arranged in a zigzag manner as shown in FIGS. 8 and 9, and is prepared by extruding an aluminum alloy. This extrusion 26 includes five plate-like metal members, namely, aluminum alloy plates 27, 28, 29, 30 and 31 in the illustrated embodiment, and is used for production of a large-sized panel such as a floor panel for a vehicle which has the aluminum alloy plates 27, 28, 29, 30 and 31 as components.

In the extrusion 26, each of the folded connecting portions 32 located between the adjacent aluminum alloy plates 27 and 28; 28 and 29; 29 and 30; and 30 and 31 and extending in the extruding direction "a" is formed by connecting protrusions 33 and 34 extending from the facing inclined surfaces d and e; f and g; h and i; and j and k of the aluminum alloy plates 27 and 28; 28 and 29; 29 and 30; and 30 and 31 which are in the adjoining relationship, respectively. The adjacent aluminum alloy plates 27 and 28; 28 and 29; 29 and 30; and 30 and 31 have welding protrusions 35 and 36 extending in the same direction as the connecting protrusions 33 and 34 from inclined surfaces c and f; e and h; g and j; and i and m of the aluminum alloy plates 27 and 28; 28 and 29; 29 and 30; and 30 and 31 which are in the non-adjoining relationship, respectively.

One plate of each pair of adjacent aluminum alloy plates 27 and 28; 28 and 29; 29 and 30; and 30 and 31 has an engagement projection 37 located between the connecting protrusion 33 and the welding protrusion 35, and the other plate has an engagement recess 38 located between the connecting protrusion 34 and the welding protrusion 36.

The engagement projection 37 is a hook-shaped plate in the illustrated embodiment, which is connected at its base end to the end face 39 and has, at its tip end, an arcuate folded portion 40 folded toward the welding protrusion 35. The engagement recess 38 is a hook-shaped groove defined by a projection 41 located on an inner surface of the welding protrusion 36. A surface of the projection 41 located adjacent a tip end face 42 of the welding protrusion 36 is formed into a slope 43 inclined from its protruding end in a direction opposite from an end face 44 of each of the aluminum alloy plates 28, 29, 30 and 31.

In the butt welding of the adjacent two aluminum alloy plates 27 and 28; 28 and 29; 29 and 30; and 30 and 31 by a laser beam, the following steps are conducted sequentially.

Figure 10:
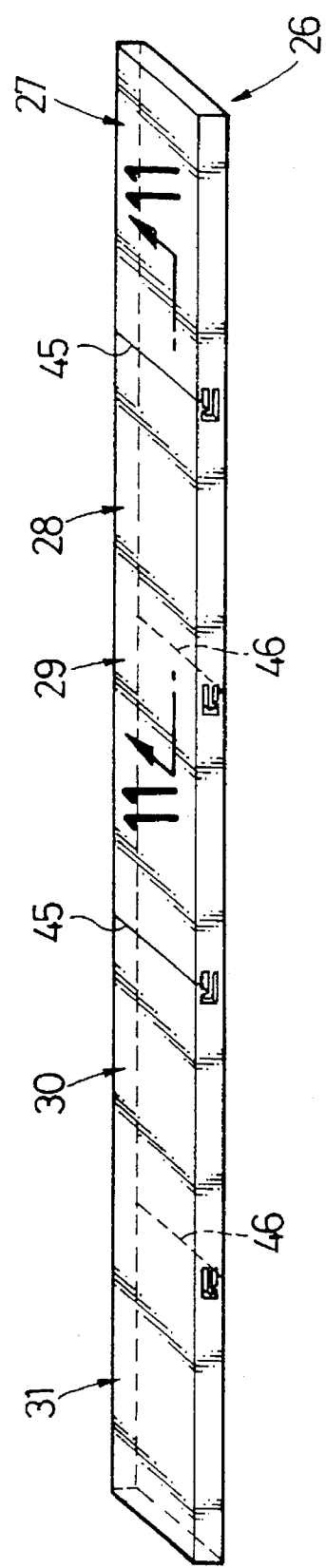
FIG. 10 is a perspective view of the extrusion of FIGS. 8 and 9 developed into a flat plate-like configuration.
Figure 11:
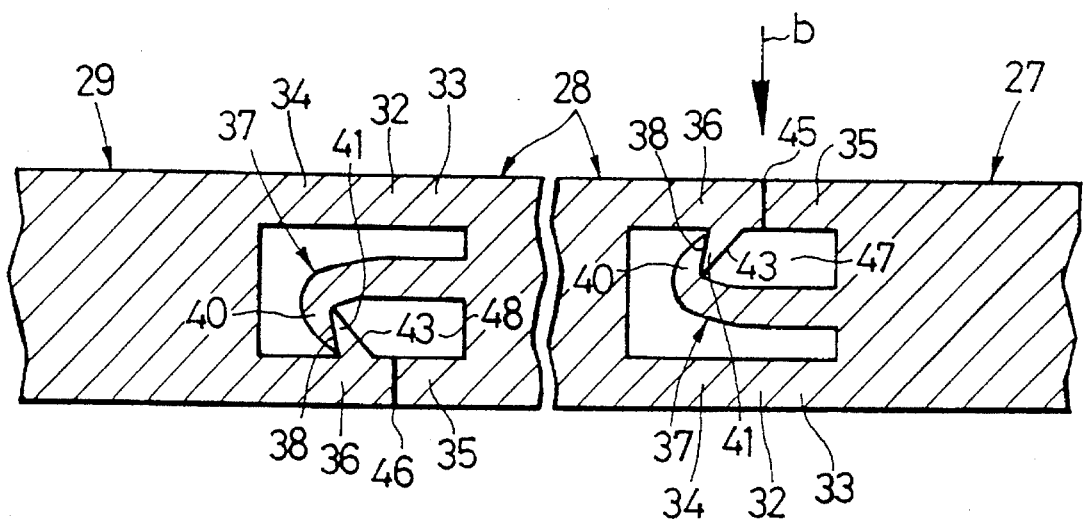
FIG. 11 is a sectional view taken along a line 11—11 in FIG. 10.

(a) As shown in FIGS. 10 and 11, the extrusion 26 is developed into a flat plate-like configuration by unfolding the folded connecting portions 32 to butt the welding protrusions 35 and 36 of the adjacent aluminum alloy plates 27 and 28; 28 and 29; 29 and 30; and 30 and 31 to each other and to bring the arcuate folded portions 40 of the engagement projections 37 into engagement with the engagement recesses 38, respectively.

This engagement is easily and reliably achieved by the arcuate folded portion 40 sliding on the slope 43 of the projection 41 to pass over the projections 41, while being resiliently deformed.

The engagement of the engagement projection 37 with the engagement recess 38 maintains the butted state and defines the voids 47 and 48 in front of the butt regions 45 and 46 of the welding protrusions 35 and 36 in the direction "b" of irradiation of the laser beam.

Figure 12:
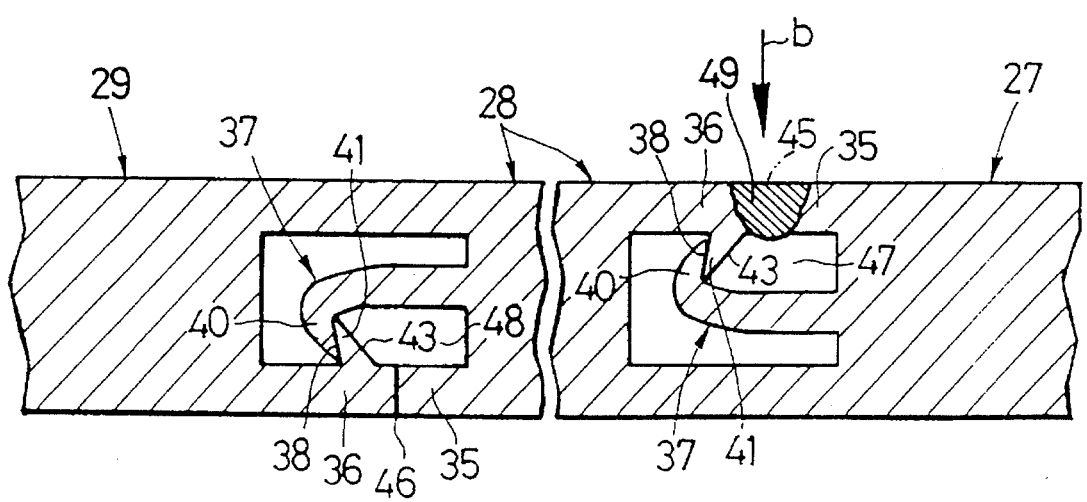
FIG. 12 is a sectional view, similar to FIG. 11, of the extrusion welded in one of butted regions by a laser.

(b) As shown in FIGS. 10 and 12, the laser beam is irradiated to the two butt regions 45 located on one surface of the extrusion 26 developed into the flat plate-like configuration to bond the welding protrusions 35 and 36 to each other through a fusion weld 49 without melting of the engagement recess and projection 37 and 38.

Figure 13:
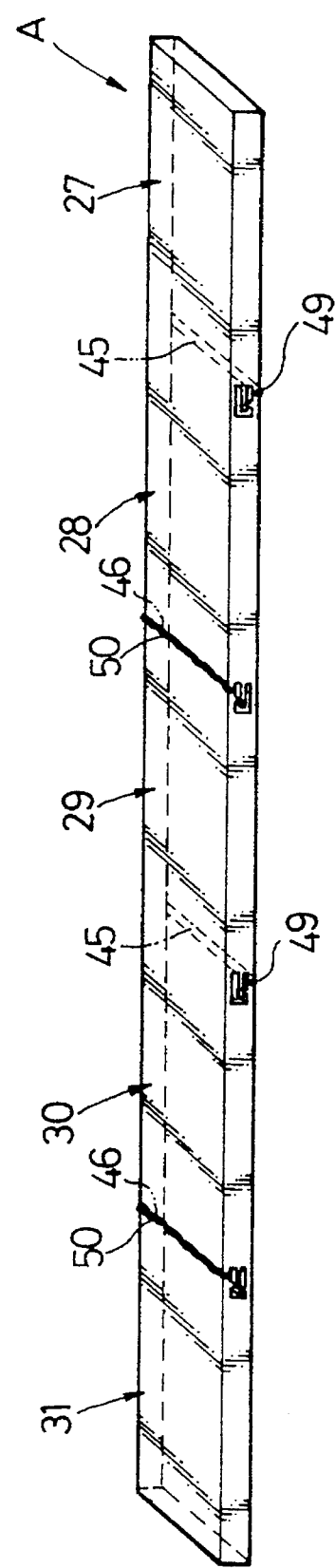
FIG. 13 is a perspective view of a large-sized panel.

(c) After the extrusion 26 is turned from top to bottom, the laser beam is irradiated to the two butt regions 46 located on the other surface to bond the welding protrusions 35 and 36 to each other through a fusion weld 50 without melting of the engage recess and projection 38 and 37, as shown in FIG. 13.

In this manner, a large-sized panel A comprising the five aluminum alloy plates 27, 28, 29, 30 and 31 is produced.

In this second embodiment, because of the connecting portions 32, the number of welding points is reduced by half, as compared with the first embodiment. Therefore, when a large-sized panel A comprising a plurality of aluminum alloy plates 27 to 31 is produced, it is possible to enhance the welding efficiency, to eliminate the exposure of the engagement recess and projection 38 and 37 to provide an improved external appearance, and further to reduce the size of extruding dies. Moreover, it is possible to inhibit any welding distortion of the large-sized panel A, because the welding is performed in spaced locations on the opposite sides.

Other functional effects are the same as in the first embodiment and the butt welding conditions are also the same as in the first embodiment.

Figure 14:
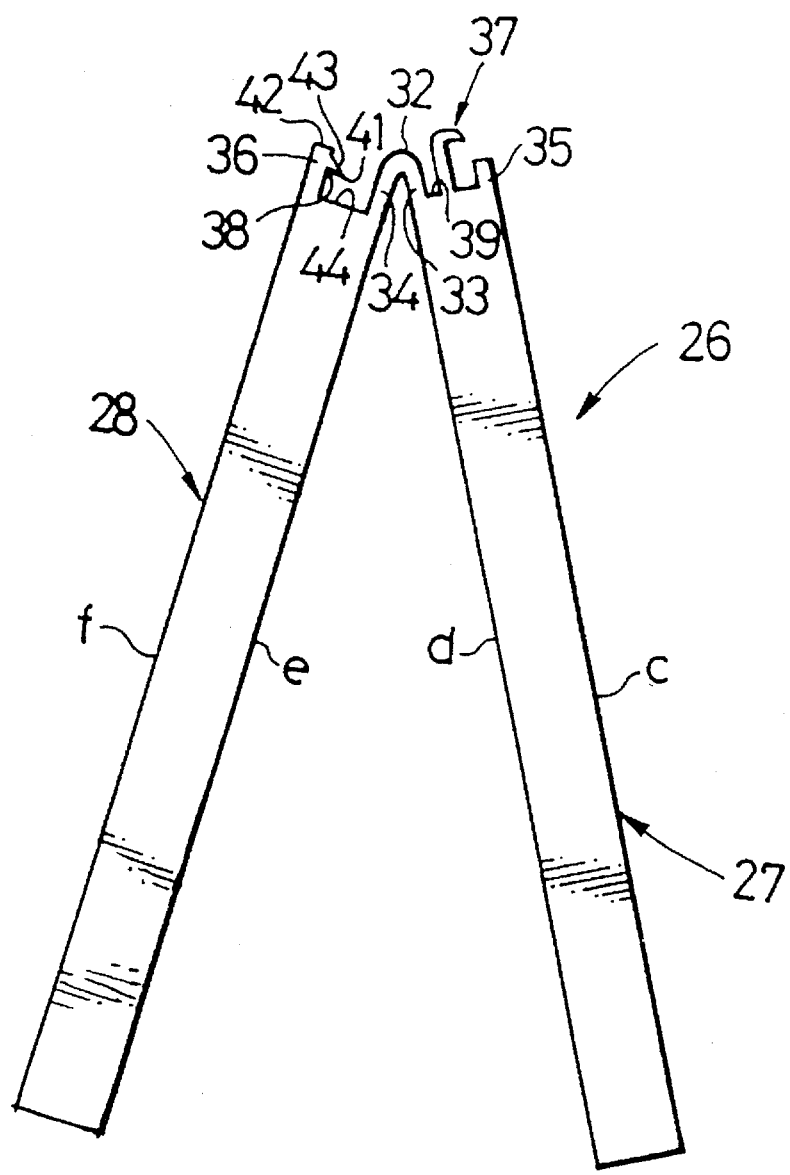
FIG. 14 is an end view of another example of an extrusion.

An extruse in 26 comprising only two aluminum alloy plates 27 and 28 interconnected and disposed in a V-shaped arrangement, as shown in FIG. 14, similar to the embodiment of FIGS. 8–13 may be used.

What is claimed is:

1. A butt welding process using a high density energy beam, comprising the steps of:
   butting welding protrusions between first and second metal members by the steps of
      bringing an engagement projection of said first metal member into engagement with an engagement recess of the second metal member,
      resiliently deforming at least one of said engagement projection and said engagement recess to achieve a locking engagement between said engagement projection and said engagement recess thereby maintaining a butted state; and
   irradiating the high density energy beam to said butt welding protrusions to bond said welding protrusions to each other.

2. A butt welding process using a high density energy beam according to claim 1 further comprising the step of defining at least one void in back of said welding protrusions in a direction of irradiation of the high density energy beam.

3. A butt welding process using a high density energy beam according to claim 2, wherein said at least one void is maintained in an inert atmosphere.

4. A butt welding process using a high density energy beam according to claim 1, wherein said first and second metal members are aluminum alloy plates formed by extruding.

5. A butt welding process using a high density energy beam, comprising the steps of:
   preparing an extrusion having a plurality of plate-like metal members connected to one another with a folded connecting portion between each adjacent two plate-like metal members of the extrusion being formed by connecting protrusions extending from one surface of each of the two said plate-like metal members which are in an adjoining relation, the adjacent two plate-like metal members having welding protrusions, respectively, which extend in the same direction as the connecting protrusions from two other surfaces of said plate-like metal members which are in a non-adjoining relation, one of the adjacent two plate-like metal members having an engagement projection located between said connecting protrusion and said welding protrusion and the other plate-like metal member having an engagement recess located between said connecting protrusion and said welding protrusion;
   extending said extrusion into a flat plate-like configuration by unfolding said folded connecting portions to butt said welding protrusions of each adjacent two plate-like metal members against each other and to bring said engagement projection into engagement with said engagement recess, thereby maintaining the butted state and defining voids in back of butt regions of the welding protrusions in a direction of irradiation of the high-density energy beam;
   irradiating the high-density energy beam to said butt regions to bond said two welding protrusions to each other.

6. A butt welding process using a high density energy beam according to claim 5, wherein said extrusion is formed from an aluminum alloy.

7. A butt welding process using a high density energy source according to claim 5, wherein at least three plate-like metal members are connected to one another and arranged in a zigzag manner in said extrusion.

8. A butt welding process using a high density energy beam, comprising the steps of:
   preparing an extrusion having two plate-like metal members connected to each other and disposed in a V-shaped arrangement, a folded connecting portion between said two plate-like metal members of said extrusion being formed by connecting protrusions extending from one surface of each of the two said plate-like metal members which are in an adjoining relation, said two plate-like metal members having welding protrusions, respectively, which extend in the same direction as said connecting protrusions from two other surfaces of said plate-like metal members which are in a non-adjoining relation, one of said two plate-like metal members having an engagement projection located between said connecting protrusion and said welding protrusion and the other plate-like metal member having an engagement recess located between said connecting protrusion and said welding protrusion;
   extending said extrusion into a flat plate-like configuration by unfolding said folded connecting portions to butt said welding protrusions of the two plate-like metal members against each other and to bring said engagement projection into engagement with said engagement recess, thereby maintaining the butted state and defining voids in back of butt regions of the welding protrusions in a direction of irradiation of the high-density energy beam;
   irradiating the high-density energy beam to said butt regions to bond said two welding protrusions to each other.

9. A butt welding process using a high density energy beam according to claim 8, wherein said extrusion is formed from an aluminum alloy.

10. A butt welding process using a high density energy beam according to claim 5, 6, 7, 8 or 9, wherein said voids are maintained in an inert atmosphere.

* * * * *